(12) United States Patent
Jarnjevic et al.

(10) Patent No.: US 7,119,143 B2
(45) Date of Patent: Oct. 10, 2006

(54) SILICONE PADS FOR ELECTRONICS THERMAL MANAGEMENT

(75) Inventors: Snjezana Jarnjevic, Kansas City, KS (US); Manford L. Eaton, Stilwell, KS (US)

(73) Assignee: Laird Technologies, Inc., St. Louis, MO (US)

( * ) Notice: Subject to any disclaimer, the term of this patent is extended or adjusted under 35 U.S.C. 154(b) by 107 days.

(21) Appl. No.: 10/793,612

(22) Filed: Mar. 4, 2004

(65) Prior Publication Data

US 2005/0197448 A1   Sep. 8, 2005

(51) Int. Cl.
*C08L 83/00* (2006.01)
(52) U.S. Cl. .................. 524/588; 524/430; 528/15; 528/31; 528/32; 525/478; 525/479
(58) Field of Classification Search ............. 528/15, 528/31, 32, 501
See application file for complete search history.

(56) References Cited

U.S. PATENT DOCUMENTS

| 5,679,457 | A | | 10/1997 | Bergerson | |
|---|---|---|---|---|---|
| 6,096,414 | A | * | 8/2000 | Young | 428/220 |
| 2002/0143092 | A1 | * | 10/2002 | Matayabas, Jr. | 524/439 |
| 2003/0049466 | A1 | * | 3/2003 | Yamada et al. | 428/447 |

OTHER PUBLICATIONS

K.C. Abrasive Company, LLC, "Duralum CR3" specification sheet, effective date Jan. 01, 2002.
Basf Corporation, "Masil SF 201 Vinyl Functional Fluid" technical bulletin, 2002.
Basf Corporation, "Masil SF 305 Hydrogen Capped Polysiloxane" technical bulletin, 2002.
Basf Corporation, "Masil XL-1 Cross Linker" technical bulletin, 2002.
Anderson & Associates, LLC, "ANDISIL 2827-186L Fluid" specification sheet.
Anderson & Associates, LLC, "Catalyst 512" technical data sheet, May 2001.

\* cited by examiner

*Primary Examiner*—Marc S. Zimmer
(74) *Attorney, Agent, or Firm*—Harness, Dickey & Pierce, P.L.C.

(57) ABSTRACT

A method of choosing a formulation for a carrier free pad having desired thermal conductivity and elastomeric properties therein which will produce a pad having a desirable thermal impedance. A combination of a vinyl functional fluid, hydrogen capped polysiloxane, cross linker and powder in the form of heat conductive particles with or without electrically insulating particles is utilized which is variable according to the desired thickness, elastomeric and thermal characteristics of the pad. Inhibitors and catalysts may be utilized to control reaction rate. The formulation enables one to more efficiently arrive at a final formulation for a thermal pad having the desired performance characteristics according to the job at hand.

5 Claims, 11 Drawing Sheets

Figure 1.

Thick pad conforming to contours of electronic components.

Figure 2.

Thin pad conforming to a nominally flat component and heat sink.

FIGURE OF MERIT

| Fig.: | Tests: | A (Example 1) | Y | Z | X |
|---|---|---|---|---|---|
| ** | Carrier | 0 | 1 | 0 | 0 |
| 3 | Exuded Oil | 1 | 3 | 4 | 2 |
| 4 | Pressure vs. Deflection | 2 | 1 | 3 | 4 |
| 5 | Compression Set | 1 | 2 | 3 | 4 |
| 6 | Thermal Impedance | 2 | 2 | 1 | 4 |
|  | Overall Points | 6 | 9 | 11 | 14 |

| Tests: | Ranking: |
|---|---|
| Carrier | with=1, without=0 |
| Exuded Oil | 1=best (least amount of oil), 5=worst (most amount of oil) |
| Pressure vs. Deflection | 1=best (most easily compressed), 5=worst (least easily compressed) |
| Compression Set | 1=best (least compressed), 5=worst (most compressed) |
| Thermal Impedance | 1=best (lowest value), 5=worst (highest value) |
| Overall Points | best (lowest value), worst (highest value) |

FIGURE OF MERIT

| Fig.: | Tests: | AA (Example) | TT | YY | UU |
|---|---|---|---|---|---|
| ** | Carrier | 0 | 1 | 0 | 1 |
| 8 | Exuded Oil | 1 | 2 | 3 | 4 |
| 9 | Pressure vs. Deflection | 2 | 1 | 3 | 4 |
| 10 | Compression Set | 1 | 1 | 4 | 1 |
| 11 | Thermal Impedance | 3 | 2 | 1 | 4 |
| | Overall Points | 7 | 7 | 12 | 14 |

| Tests: | Ranking: |
|---|---|
| | with=1, without=0 |
| Carrier | 1=best (least amount of oil), 5=worst (most amount of oil) |
| Exuded Oil | 1=best (most easily compressed), 5=worst (least easily compressed) |
| Pressure vs. Deflection | 1=best (least compressed), 5=worst (most compressed) |
| Compression Set | 1=best (lowest value), 5=worst (highest value) |
| Thermal Impedance | best (lowest value), worst (highest value) |
| Overall Points | |

Fig. 12

SILICONE PADS FOR ELECTRONICS THERMAL MANAGEMENT

BACKGROUND OF THE INVENTION

This invention relates to thermally conductive pads and, more particularly, to a method for selecting the formulation of a silicone pad providing desirable elastomeric and thermally conductive characteristics therein.

Circuit designs for electronic devices have become more sophisticated resulting in various components closely packed on circuit boards. As a result, the problem of heat dissipation generated by component operation arises which raises the probability of component malfunction, if not failure.

Heat dissipation may be achieved by the use of a heat sink, whether in the form of a separate plate or device chassis, which is positioned adjacent the component for a heat transfer thereto. The interface between the respective faces may be irregular resulting in air spaces therebetween. As air is a poor heat conductor the spaces denigrate the heat transfer between the component and the heat sink. Thus, the operating temperature of the component may rise above its desired value.

This heat transfer may be improved by inserting a thermally conductive material between the component and heat sink so as to eliminate the air spaces therebetween. Such materials have been in the forms of waxes, greases and oils, inclusive of silicone materials loaded with heat conducting particles to increase conductivity. The silicone matrix needs to be very soft as the particle loading decreases its conformability, which in turn decreases the conformance of the material about the component face and the circuit board such that air gaps may result.

Such a soft material needs a supporting substrate, web or other carrier so as to maintain cohesion. However, carriers such as Fiberglas® or substrates prevent the material from being sufficiently elastic and so have limited elongation and flexion characteristics. Foam carriers that are impregnated with silicone and heat conducting particles have limited compression once the foam cells are collapsed. Such carriers, whether Fiberglas® cloth, foam substrate, etc., are unable to intimately conform to various contours of electronic components and so leave air gaps, which cause an increase in thermal impedance.

To eliminate the carrier and yet maintain conformability, oils and/or plasticizers are added. However, the resulting material may present poor thermomechanical properties. Moreover, when the component is compressed against the heat sink with the thermal pad therebetween, exudation of silicone oils into a monomolecular layer may result which contaminates the surrounding circuit board and components. This problem of silicone exudation has led some electronics manufacturers to forbid the use of silicone in thermal pads despite the desire to use such a silicone based material due to its conformance advantages. Accordingly, it is desirable to provide a silicone based thermal pad loaded with heat conducting particles which has the desirable cohesion, conformance, thermal impedance and elastomeric properties; does not require a substrate or carrier and does not exude undesirable amounts of oil when compressed in its functional environment.

SUMMARY OF THE INVENTION

In response thereto we have invented a method of selecting materials for a silicone thermal pad loaded with heat conducting particles which has the desirable thermal impedance and elastomeric properties without the exudation of oils at normal compression.

Our preferred embodiment utilizes a combination of a vinyl functional fluid ("VFF"), a chain extender in the form of a hydrogen capped polysiloxane ("HCP"), a silicone polymer cross linker containing silicon-hydride groups, a powder containing thermally conductive particles (electrically insulating and/or non-insulating), and an inhibitor all mixed at room temperature and subsequently de-aired. A powder represented as electrically insulating particles, e.g., beryllium oxide, boron nitride, zinc oxide and magnesium oxide, can be used. When electrical insulation is not required metal particles, e.g., silver, aluminum and carbon, may be incorporated to enhance thermal conductivity. A platinum catalyst is added so as to accelerate cross linking. The VFF, HCP, cross linker and powder elements present the ability to vary the formulation so that the desired characteristics in the thermal pad can be achieved. Given the preferred percentages herein and recognizing the cross effect of such elements, efficient thermal pads which readily conform to the component and heat sink without the exudation of undesirable oils therefrom can be efficiently achieved.

It is therefore a general object of this invention to provide a base formulation for a thermal pad which can be selectably varied according to the job at hand so as to present a cohesive silicone thermal pad having desirable thermal impedance, cohesion and elastomeric properties therein.

Another important object of this invention is to provide a thermal pad, as aforesaid, which precludes the need to utilize a carrier which may limit the desired performance characteristics of the pad.

A further object of this invention is to provide a pad, as aforesaid, wherein excessive silicone oils or other plasticizers need not be utilized in order to maintain pad conformability.

Another important object of this invention is to provide a thermal pad, as aforesaid, wherein the exudation of undesirable oils under a normal working compression is limited, if not precluded.

A still further object of this invention is to provide a pad, as aforesaid, wherein the desired characteristics of minimal oil exudation, pad deflection, compression set and thermal impedance can be simultaneously achieved.

Other objects and advantages of this invention will become apparent from the following description taken in connection with the accompanying drawings, wherein is set forth by way of illustration and example, now preferred embodiments of this invention.

DESCRIPTION OF THE PREFERRED EMBODIMENT

More particularly, we have invented a method of choosing a formulation for a silicone thermal pad recognizing the desired elastomeric and thermal impedance characteristics for such a pad. It is understood that this method, once given the basic formulation, presents a novel "balancing" method allowing for variance of the elements according to the desired properties of the thermal pad suitable for the job at hand.

Accordingly, recognizing the above-discussed limitations of the prior art, it is desirable to provide a silicone thermal pad having the desired elastomeric and thermal impedance characteristics by varying the percentage by weight of the below elements until the desired pad material is achieved.

A VFF presents a chain of repetitive molecules, including silicon and oxygen, with R groups that may be H, OH or Me, believed to be as below shown.

$x = 1-1000$
$R = H, OH, Me$

The molecular weight of such a VFF can vary, it being understood that the higher the molecular weight the more viscous the fluid. One form of the VFF fluid is available from Lubrizol Corporation (formerly BASF) of Cheyenne, Wyo. known as MASIL® SF 201 Vinyl Functional Fluid having the following specifications and typical physical properties.

Specifications

| | |
|---|---|
| Solids, % @ 150° C., 1.0 hrs. | 97.5–100.0 |
| Water, % | 0.10 max. |
| Iodine Value, % | 2.20–3.80 |
| Viscosity @ 25° C., cSt | 850–1150 |
| Appearance, @ 25° C. | Clear colorless liquid |

Typical Physical Properties

| | |
|---|---|
| Form @ 25° C. | Liquid |
| Specific gravity @ 25° C. | 0.965 |
| Refractive index @ 25° C. | 1.404 |
| Flash point, PMCC, ° F. | >300 |

This VFF product, as used in compounding silicone elastomer, may be heated or room temperature cured (RTV), it being recognized that such curing is normally accomplished with 2%–4% of a cross linker such as the Lubrizol MASIL® XL-1 as below described.

A reactive silicone polymer containing silicon-hydride end groups with R groups that may be H, Me or OH is also used believed to be as below shown.

$y = 1-1000$
$R = H, Me, OH$

This product, commercially available from the Lubrizol Corporation, is known as the MASIL® SF 305 Hydrogen Capped Polysiloxane having the following specifications and typical physical properties:

Specifications

| | |
|---|---|
| Viscosity @ 25° C., cSt | 385–550 |
| Solids, % @ 105° C., 1.0 hrs. | 99–100 |
| Appearance, @ 25° C. | Clear liquid |
| Odor | Bland |

Typical Physical Properties

| | |
|---|---|
| Specific Gravity @ 25° C. | 0.98 |
| Flashpoint, ° F. (PMCC) | >200 |
| pH | 5.0–7.5 |
| Boiling Point, ° F. | >300 |

This HCP product reacts with the VFF in the presence of a noble metal catalyst so as to elongate the VFF chain. This product has the same components as the VFF but has a hydrogen atom at the ends thereof providing for such chain extension. A partial cross linkage of the VFF molecules also occurs. The combination of the VFF and this HCP produces a material mass having elastomeric results. It is understood that the more HCP that is added to the VFF the greater the elastomeric properties of the VFF. If the VFF and HCP are the only components utilized, the resulting compound does not have sufficient cohesion for a thermal pad.

Accordingly, recognizing the above carrier limitations a cross linker is then added so as to solidify or provide cohesion to the material so as to preclude the need for a substrate, carrier or the like. This cross linker contains the silicon-hydride groups which further intertwines molecules found in the above HCP and VFF combination and is believed to be as below shown.

The addition of the cross linker to the previous material mass (VFF and HCP) increases the cohesion, it being understood that the more cross linker used the more cohesion or solid the resulting material mass.

As above described we have chosen the Lubrizol MASIL® XL-1 cross linker having the following specifications and typical physical properties:

Specifications

| | |
|---|---|
| Viscosity @ 25° C., cSt | 35.0–50.0 |
| Solids, % @ 105° C., 1.0 hrs. | 97.5–100.0 |
| Silicone Hydride, % | 24.0–28.0 |
| Water, % | 0.0–0.1 |
| Appearance, @ 25° C. | Clear liquid |

Typical Physical Properties

| | |
|---|---|
| Appearance | Clear, water-white fluid |
| Viscosity @ 25° C., cSt | Approximately 35–40 |
| Specific gravity @ 25° C. | 0.965 |
| Refractive index @ 25° C. | 1.400 |
| Flash point, PMCC ° F. | 170 |

This cross linker is a reactive silicone polymer containing silicon-hydride groups. The more cross linker used the more solid the resulting compound. If a cross linker alone was utilized with the VFF, the solidity of the material would increase but the mass would not have the desired elastomeric properties. The addition of the HCP to the VFF alone results in a material too soft for commercial use absent the carrier. Thus, utilizing this cross linker with the hydrogen-capped polysiloxane and VFF enables one to efficiently present a material mass with the desired cohesion, solidity and elastomeric properties.

Also, the powder in the form of the previously mentioned particles must be added so as to increase the thermal conductivity of the resulting material. It is understood that the addition of these particles will compromise the elastomeric characteristics of the above material mass depending upon the particle size, morphology and particle amounts. Understandably, the higher the particle loading the less conformable the material. The less pliable, the lesser the ability of the thermal pad to conform to the various contours of the component resulting in a higher probability of air gaps and thermal impedance increase. Thus, it is desirable to start with the above silicone material mass at a low Shore 00 reading in order to insure conformability once the particles are added. However, the softer the resulting material, the more likely a carrier is needed which creates the above-discussed carrier limitations of decreasing elasticity, carrier breakdown in the face of compression, lesser conformance and higher thermal impedance. Accordingly, the ability to vary the characteristics of the above three part base material, i.e., the VFF, HCP and cross linker with the powder in the form of the above particles enables one to more easily combine the particles so as to arrive at a material having the desired characteristics for the job at hand.

It is recognized that the thickness of the thermal pad may vary. However, a range of pad thicknesses from 0.25 mm to 5.0 mm will envelop a range of most pad thicknesses needed for commercial use. A thin pad having a thickness of 0.25 mm to 1.0 mm is suitable for use in the FIG. 2 environment where the irregularities in the opposing component and heat sink surfaces are minimal. Thus, the elastomeric properties need not be as critical as the pad in the FIG. 1 environment in which the pad must fill the space of heat sink/component interface and conform about the component sides.

Figure 2:
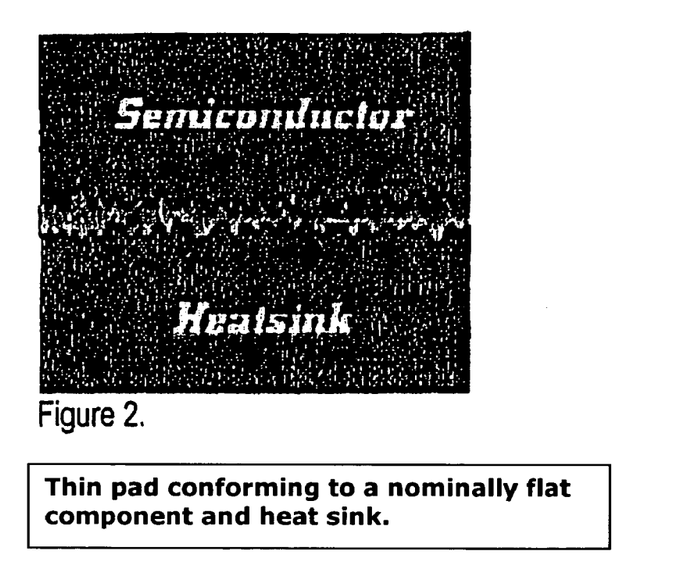
FIG. 2 is a diagrammatic view showing the use of a thin thermal pad between a flat semiconductor and heat sink.
Figure 3:
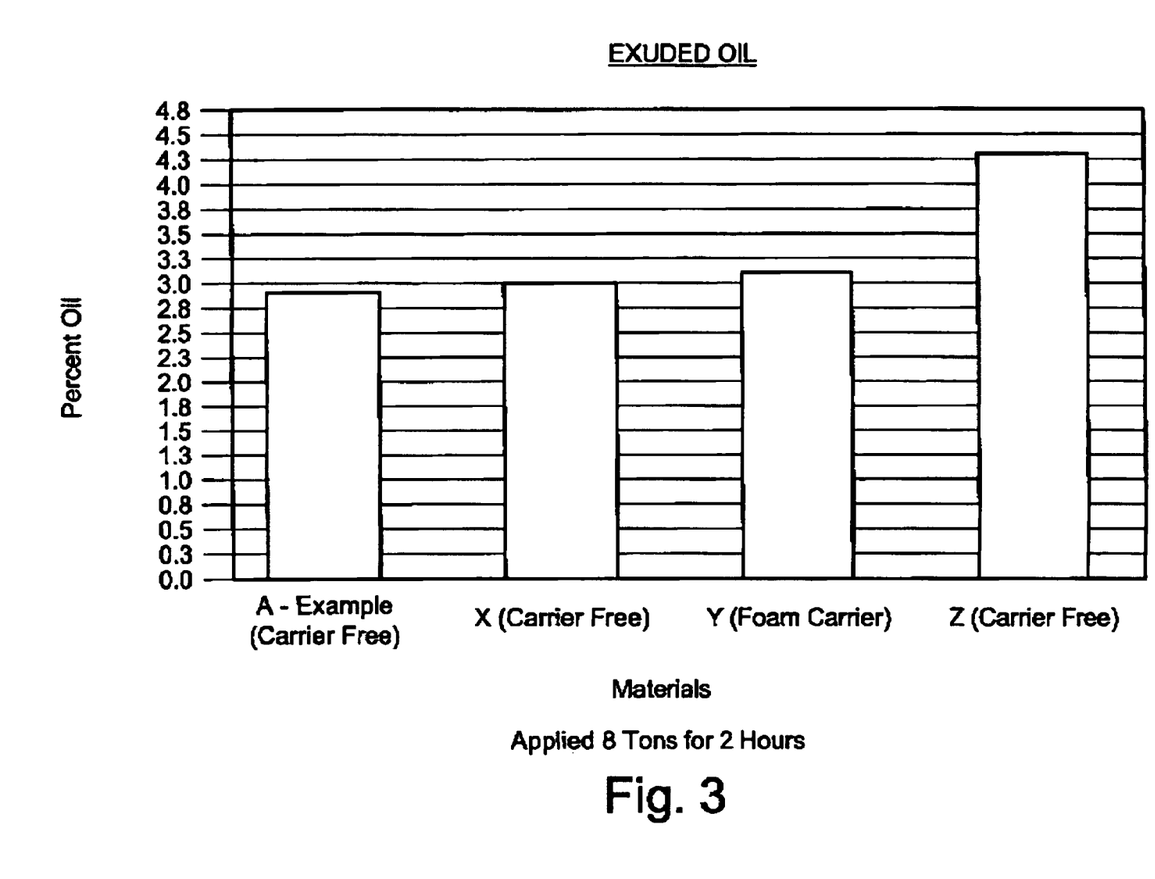
FIG. 3 is an exemplary bar graph illustrating exuded oil testing results for four different product samples, including Example A which is a formulation suitable for use as 2.5 millimeter thick thermal pads according to exemplary embodiments.
Figure 4:
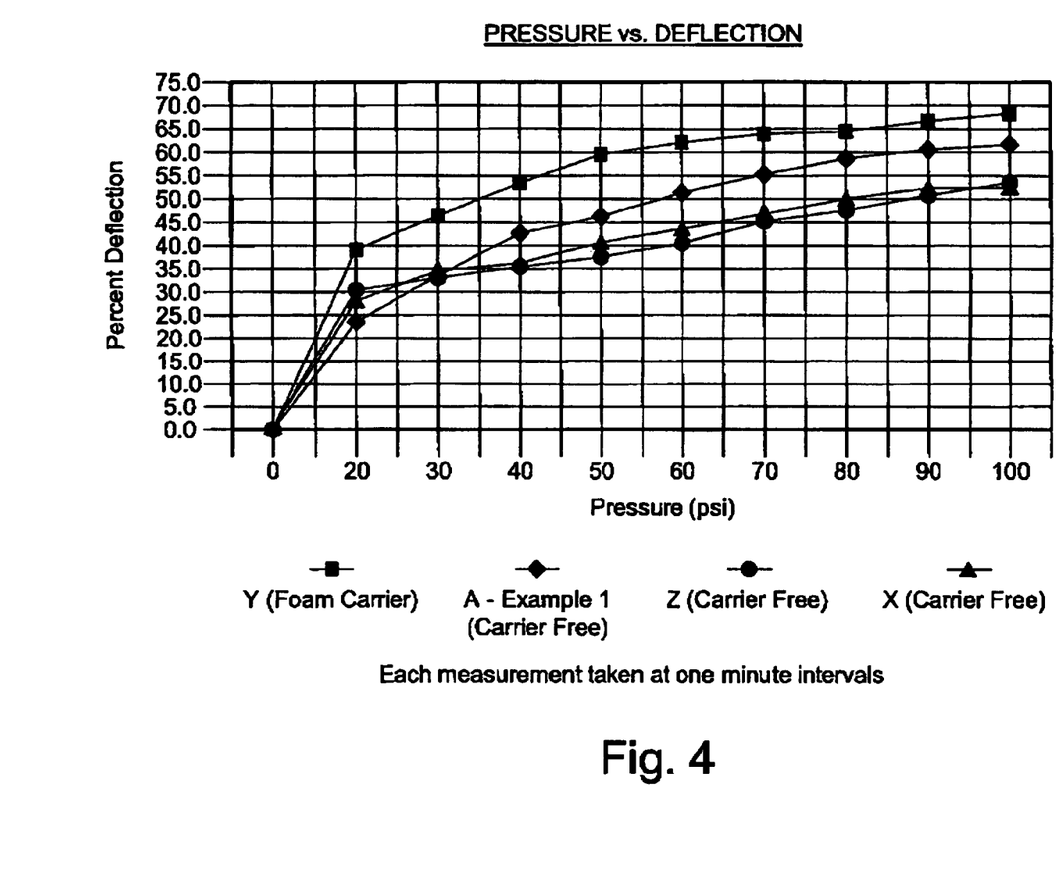
FIG. 4 is an exemplary line graph illustrating percent deflection versus pressure for each of the four product samples (also shown in FIG. 3), wherein the defection was measured as the difference in height relative to the original height taken at one minute intervals under increasing pressure.
Figure 5:
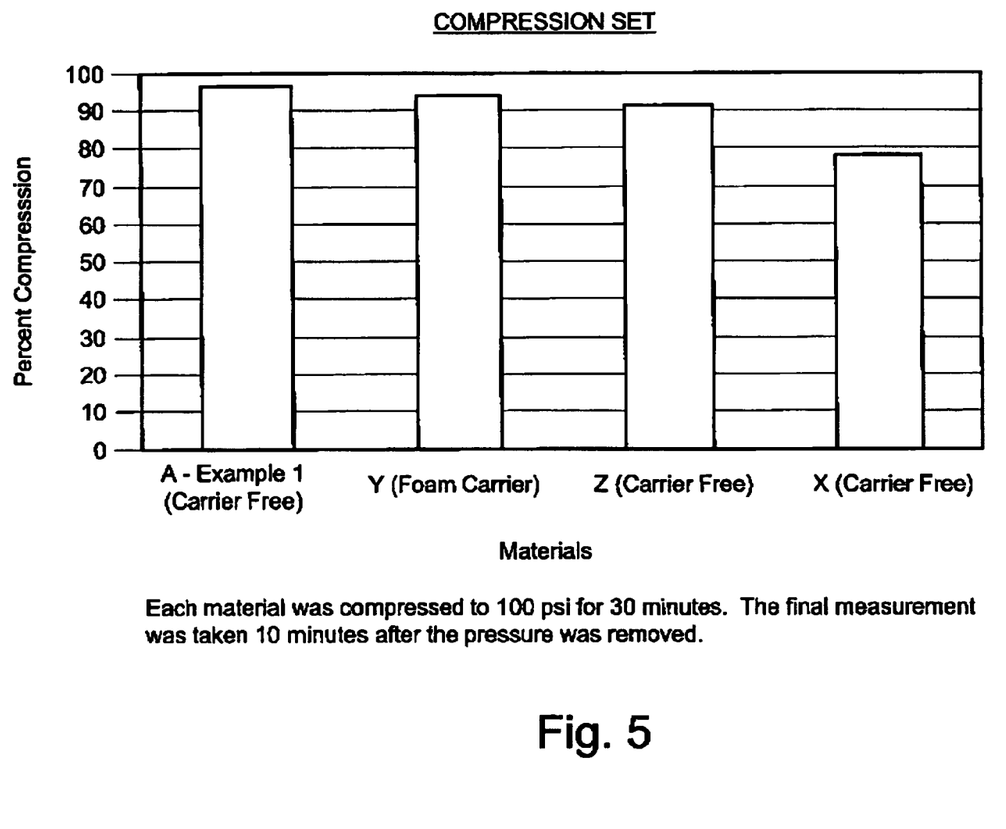
FIG. 5 is an exemplary bar graph illustrating compression set testing results relating to the ability of each of the four product samples (also shown in FIGS. 3 and 4) to return to a starting height after compression of one hundred pounds per square inch for thirty minutes, wherein the measurements were taken ten minutes after the pressure was removed.

Recognizing that a thin 0.5 mm material pad is suitable in such FIG. 2 environment the following formulation (Example AA) was found to be a desirable one:

25.68% by weight of a vinyl functional fluid 1.54% by weight of hydrogen-capped polysiloxane 0.69% by weight reactive silicone polymer cross linker containing silicon hydride groups.

0.83% by weight of Anderson and Associates Andisil 2827-186L Fluid inhibitor of Summit, N.J. having the following properties:

| | |
|---|---|
| Chemical name | 1,3-Divinyl tertamethyl disiloxane |
| CAS number | Number 2627-95-4 |
| Purity | 98.0% minimum |
| Appearance @ 25° C. | Clear, water-white liquid |
| Boiling point, degrees C. | 139° C. |
| Flash point, degrees C. | 19° C. |

70.63% by weight of an aluminum oxide powder available from K.C. Abrasive Company in Kansas City, Kans. with an average size of 17.5 microns was also used having the following properties:

| Chemical Name | % | OSHA Regulated (Y/N) | CAS # | Permissive Exposure Limit | ACGIV TLV | OSHA Carcinogen (Y/N) |
|---|---|---|---|---|---|---|
| Aluminum oxide (non-fibrous) Al2O3 | 96–97 | Y | 1344-28-1 | 5 mg/m3 | 10 mg/m3 | N |
| Titanium dioxide (TIO2) | 2.5–2.7 | Y | 13483-67-7 | 15 mg/m3 | 10 mg/m3 | N |
| Silicon dioxide (SIO2) | .50–.67 | N | 7631-86-9 | — | 6 mg/m3 | N |
| Iron oxide (Fe2O3) | .1–.2 | — | — | — | — | N |
| Other oxides less than 1% (Na2O, MgO, CaO) | | | | | | |

| | |
|---|---|
| Melting point | 2038° C. |
| Hardness | 9 Mohs, 2100 Knoop |
| Solubility | Insoluble in water and organic solvents |
| pH | 7–8 |
| Specific gravity | 3.97 gm/cc |
| Appearance and odor | Light brown, tan, odorless, blocky, dense, angular crystal |
| Flammability | Non-flammable, does not support combustion, not an explosion hazard |
| Stability | Stable, polymerization will not occur, does not react with water, air, heat or strong oxidizers |
| Bulk density (range) | .903–1.672 gm/cm3. Specific bulk density available upon request |

After mixing together in a lab mixer at room temperature, the above mixture is de-aired in a vacuum chamber. The use of the above inhibitor has no effect on the desired characteristics of the resulting thermal compound but is used only to slow the reaction time.

A 0.63% by weight of platinum catalyst for accelerating cross linking cure time may then be added (platinum complex and vinyl silicone polymer). The catalyst is available from Anderson and Associates of Summit, N.J. and has the following properties.

| | |
|---|---|
| Appearance | Yellow-brown, slightly turbid |
| Odor | Aromatic |
| Refractive Index @ 20° C. | 1,4110 |
| Viscosity at 25° C. [cps] | 400 |
| Vinyl content [mmole/gm] | 0.14 |
| Iodine value | 3.6 |
| Platinum content [%] | 2 |

Upon addition the compound is mixed with special mixing equipment to avoid air entrapment and then heated at 150° C. for three minutes. Material can then be formed by any standard fabricating procedure such as lamination, compression molding, injection molding, coating, etc. A sheet of material of 0.5 mm thick is then formed for use between the component and heat sink as shown in FIG. 2.

Figure 9:
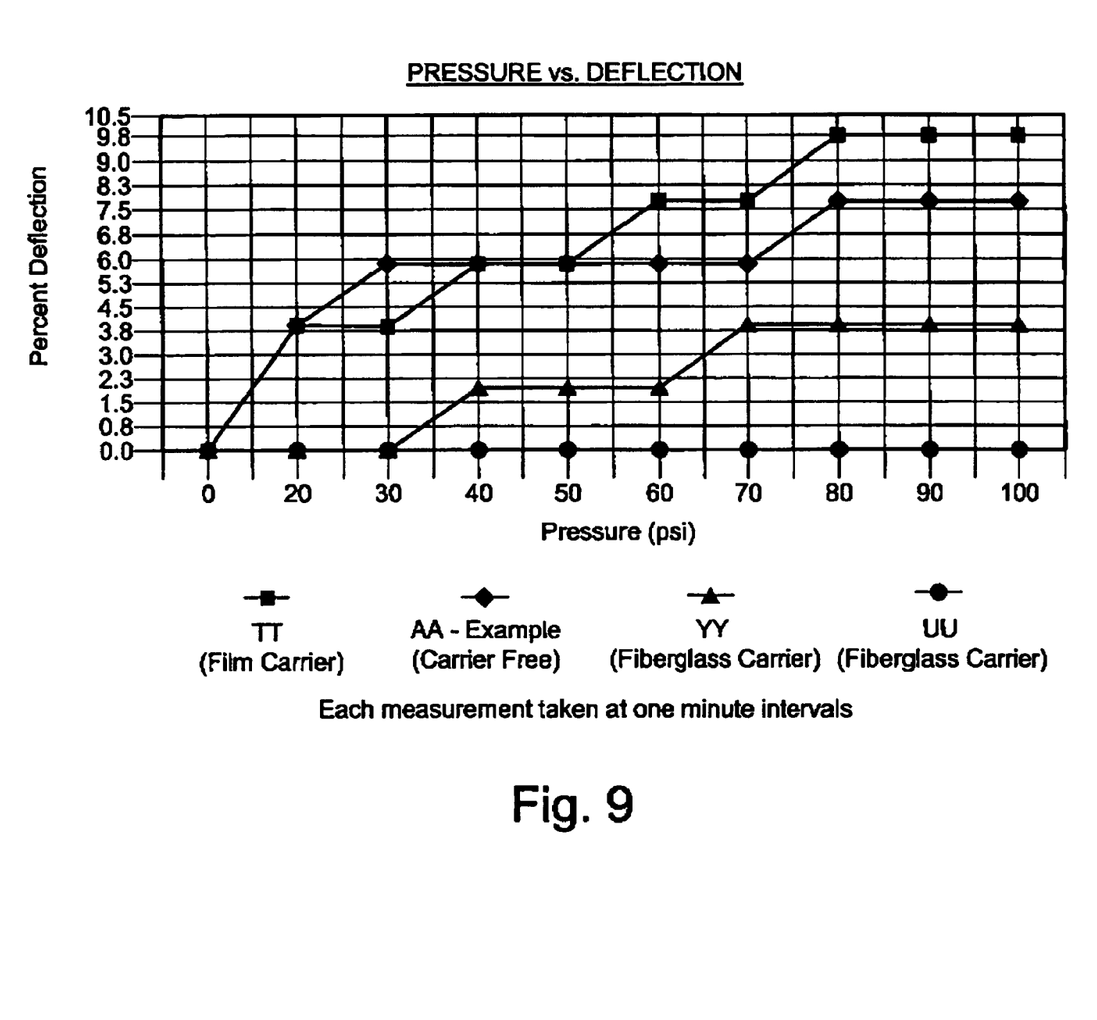
FIG. 9 is an exemplary line graph illustrating percent deflection versus pressure for each of the four product samples (also shown in FIG. 8), wherein the defection was measured as the difference in height relative to the original height taken at one minute intervals under increasing pressure.
Figure 10:
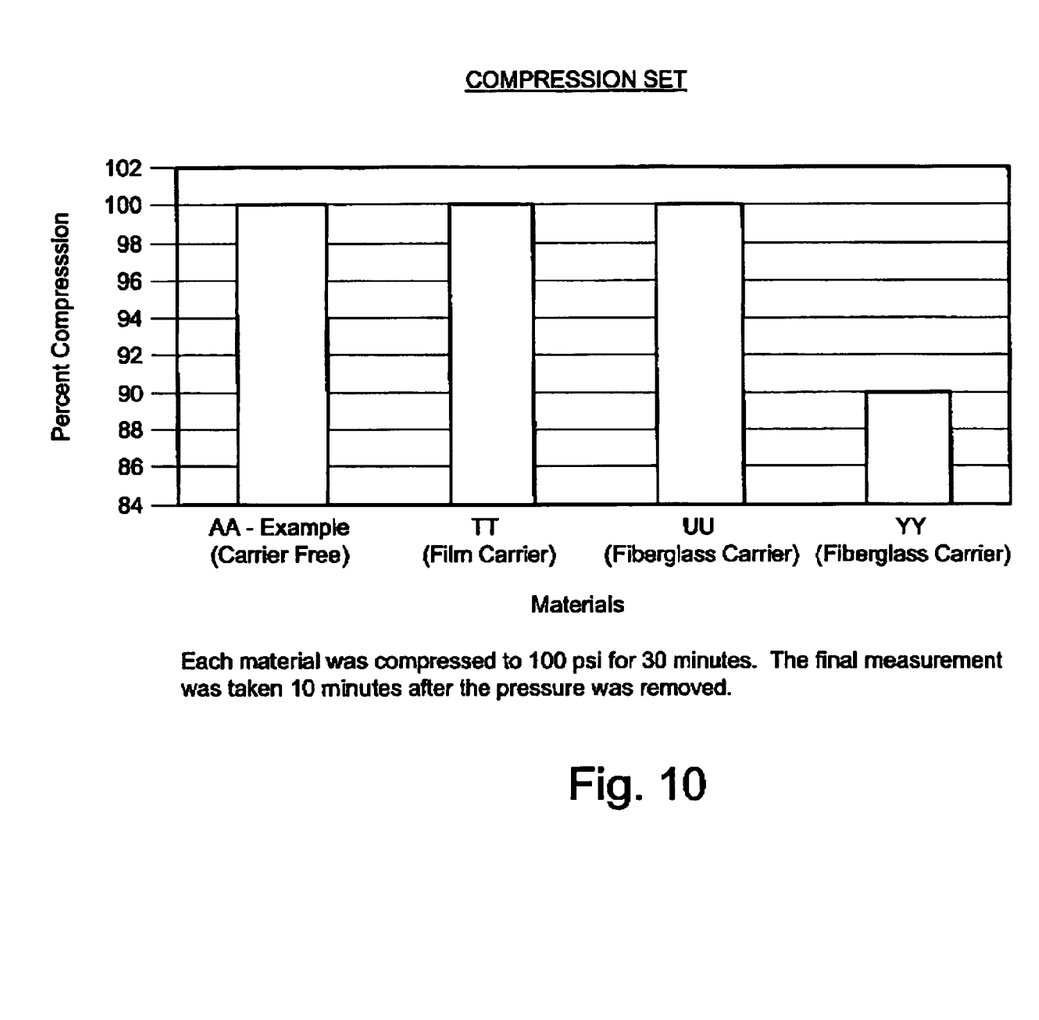
FIG. 10 is an exemplary bar graph illustrating compression set testing results relating to the ability of each of the four product samples (also shown in FIGS. 8 and 9) to return to a starting height after compression of one hundred pounds per square inch for thirty minutes, wherein the measurements were taken ten minutes after the pressure was removed.
Figure 11:
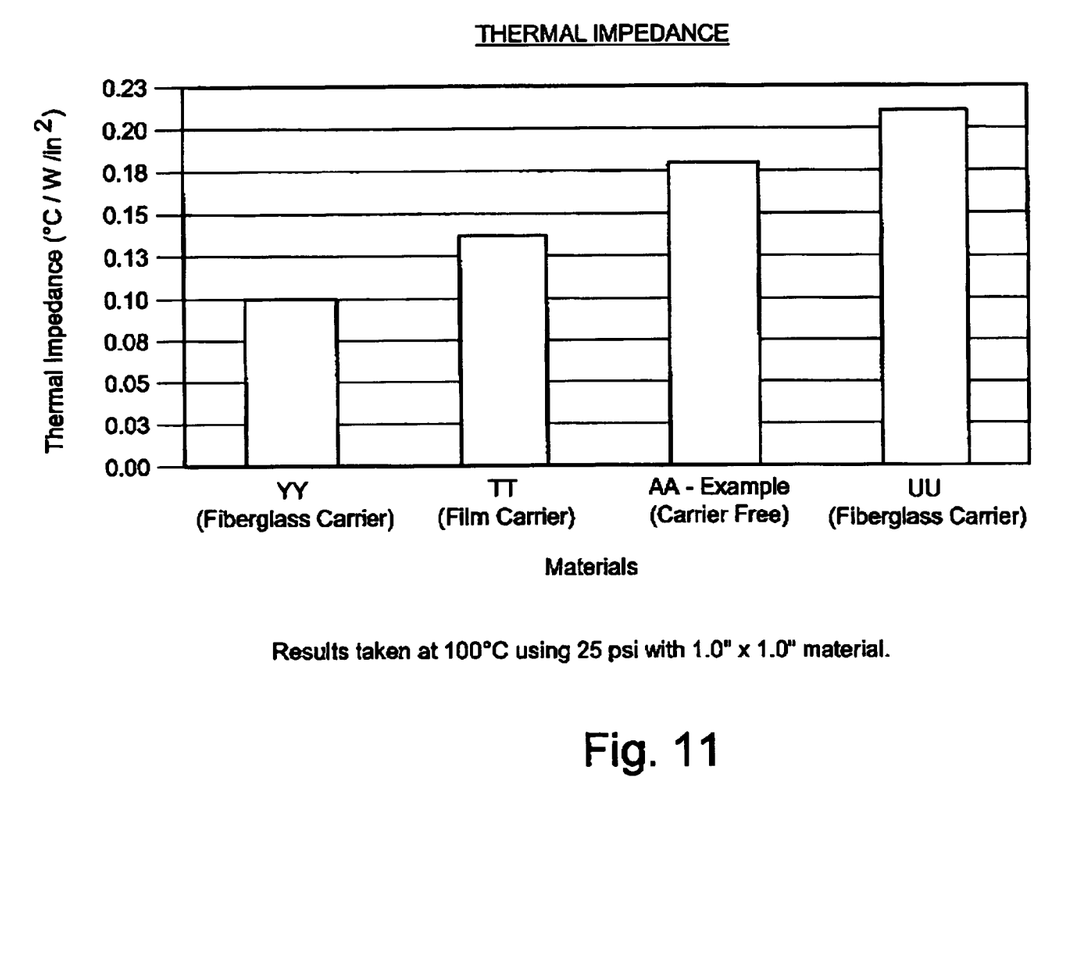
FIG. 11 is an exemplary bar graph illustrating thermal impedance testing results for each of the four product samples (also shown in FIGS. 8 through 10), wherein the results were taken at one hundred degrees Celsius using twenty-five pounds per square inch on a one inch by one inch sample.
Figure 12:
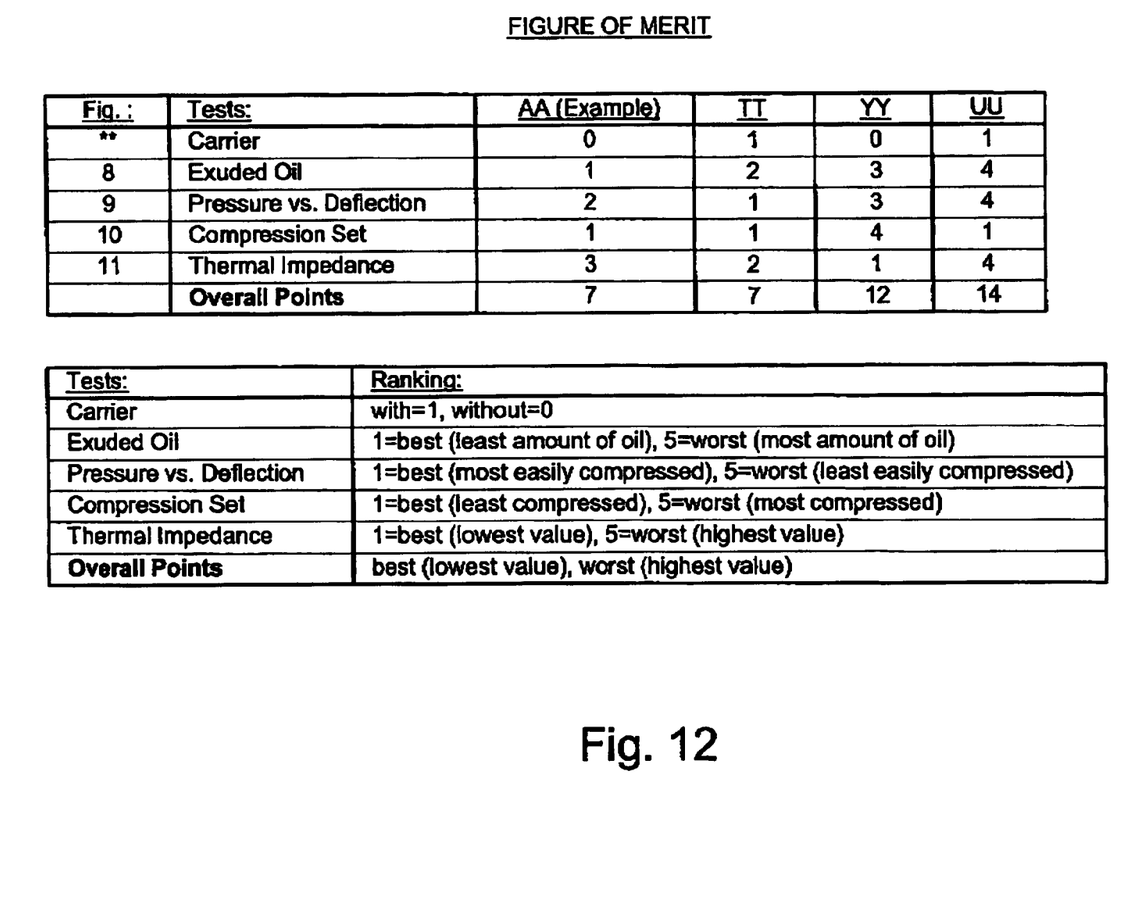
FIG. 12 is an exemplary chart with rankings for each of the four product samples, wherein rankings of zero to four points were awarded to the product samples for each test shown in FIGS. 8 through 11 depending on how that particular product sample performed against the other three product samples.

The resulting formulation was then tested and compared with other products found in the marketplace, the results being shown in FIGS. 8 through 12. Sample AA is the sample having the above formulation with samples TT, YY and UU being commercial samples having a film or Fiberglas® carrier. It is shown that our Example AA is ranked first in the exuded oil test (FIG. 8), second in the pressure v. deflection test (FIG. 9), first (tied) in the compression set test (FIG. 10), and third in the thermal impedance test (FIG. 11). Rankings as shown in FIG. 12 placed our disclosed Example AA as the top ranking (tied).

Figure 8:
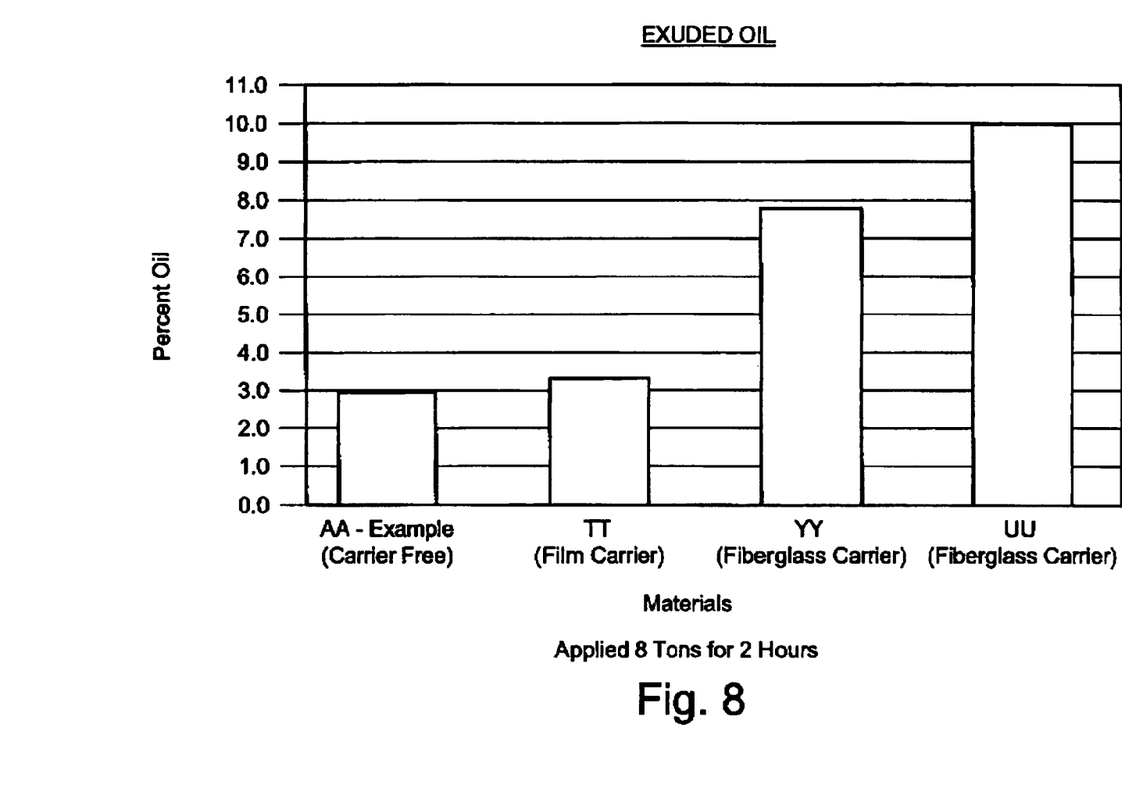
FIG. 8 is an exemplary bar graph illustrating exuded oil testing results for four different product samples, including Example AA which is a formulation suitable for use as 0.5 millimeter thick thermal pads according to exemplary embodiments.

An accelerated exuded oil test was conducted as shown in FIG. 8. Eight tons of pressure were applied for two hours at room temperature. The samples were weighed before and after pressure was applied. The tests show that our disclosed AA formulation exuded the least oil.

FIG. 9 is a deflection v. pressure test. Deflection was measured as the difference in height relative to the original height taken at one minute intervals under increasing pressures. This measurement reflects the conformance ability of the product in the environment wherein the component is pressed against the heat sink.

FIG. 10 illustrates a compression set test or the ability of the sample to return to its starting height after compression of 100 psi for 30 minutes. The measurements were taken 10 minutes after pressure release. This test reflects the ability of the pad to undergo compression, such when a component is pressed against the heat sink, and then return to its initial thickness once compression is removed. Again, our sample AA shows a 100% return even though it was carrier free.

FIG. 11 shows a thermal impedance test with the results taken at 100 degrees Celsius using 25 psi on a one inch by one inch material. As shown, the disclosed sample ranked third in thermal impedance but satisfactory to the job at hand.

Our disclosed sample ranked first in the most critical aspect, i.e., oil exudation, and maintained other desirable qualities competitive with the commercial samples. FIG. 12 shows a ranking in which 0–4 points were awarded depending on the test ranking. A "0" was awarded to our Example AA as it did not need a carrier, one of the important objects of our invention. Utilizing such rankings the disclosed sample AA achieved a ranking competitive with other samples.

It is understood that these tests were in-house tests and show that a product having competitive performance characteristics can be achieved using our starting formulation.

Figure 1:
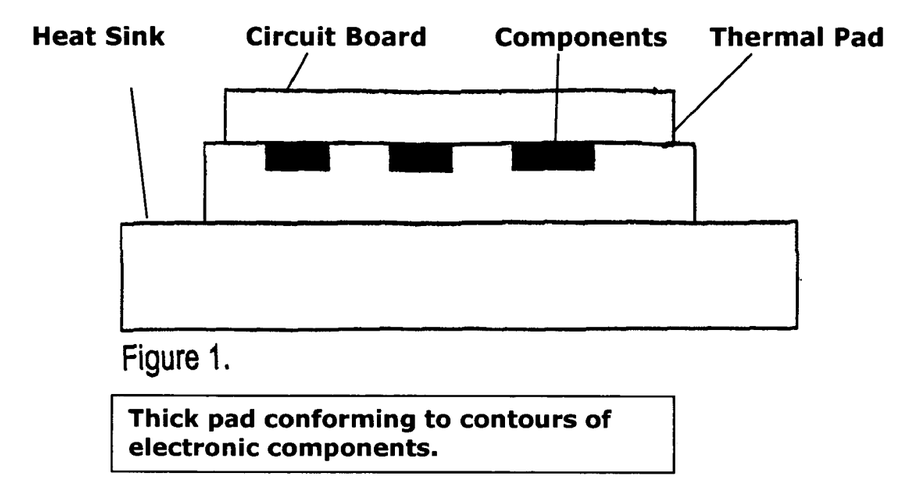
FIG. 1 is a diagrammatic view showing the conformance of a thick thermal pad with the contours of the circuit board, the electrical components thereon and the underlying heat sink.

As shown in FIG. 1, a thick 2.5 mm pad may be needed in some environments particularly when a pad must conform to the contours of a component projecting from a circuit board. Such a pad must not only conform to the irregularities of the circuit board and heat sink but also about the portion of the component projecting from the board. The following formulation (Example A) was found to be a desirable one.

30.09% by weight of the above-identified vinyl functional fluid 9.81% by weight of the above-identified hydrogen-capped polysiloxane 0.27% by weight of the above-identified cross linker 0.83% by weight of the above Anderson and Associates 2827-186L Fluid inhibitor 58.37% by weight of K.C. Abrasive aluminum oxide powder of 63 micron particles Again, the above ingredients were mixed together in a lab mixer. The above 0.63% by weight of platinum catalyst was then used. A sheet of material 2.5 mm thick was formed after curing at 160 degrees Celsius for three minutes. The pad was very soft and formable and could be compressed to less than 25% of its initial thickness. The discussion of such characteristics is as below shown (Example A) in FIGS. 3 through 7.

Figure 6:
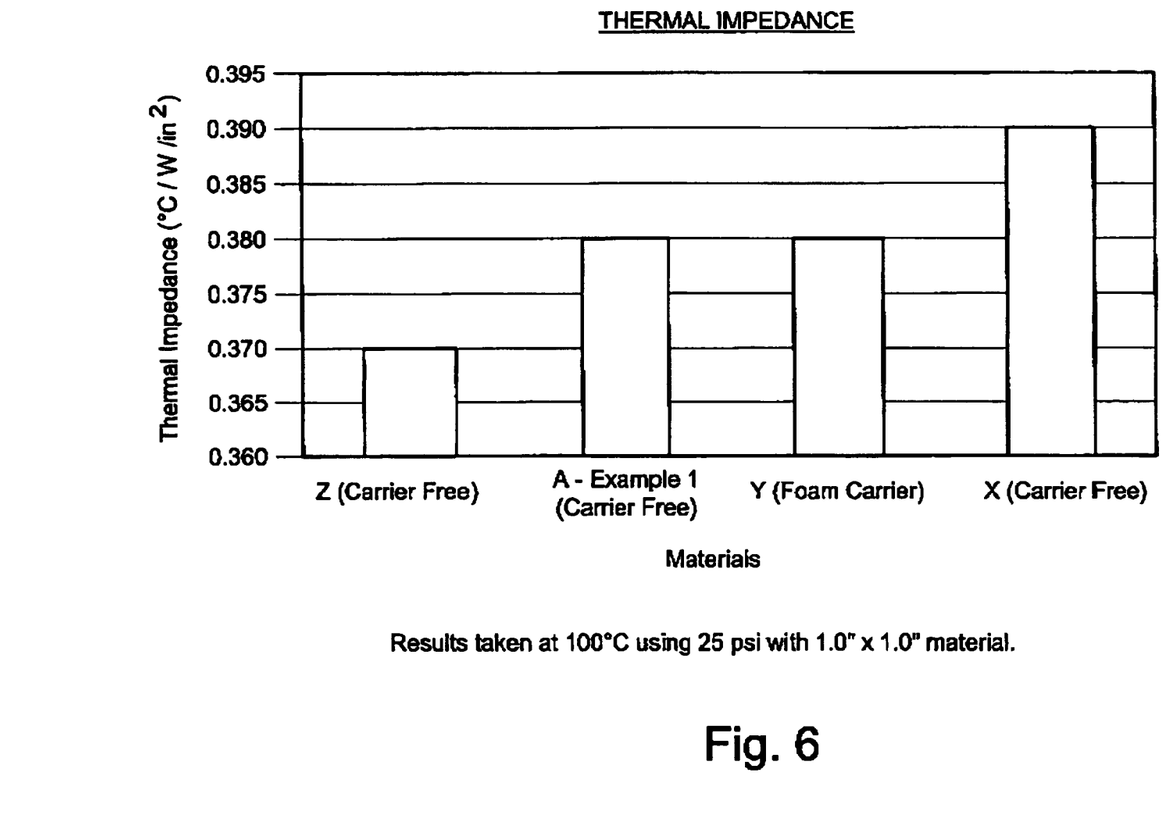
FIG. 6 is an exemplary bar graph illustrating thermal impedance testing results for each of the four product samples (also shown in FIGS. 3 through 5), wherein the results were taken at one hundred degrees Celsius using twenty-five pounds per square inch on a one inch by one inch sample.
Figure 7:
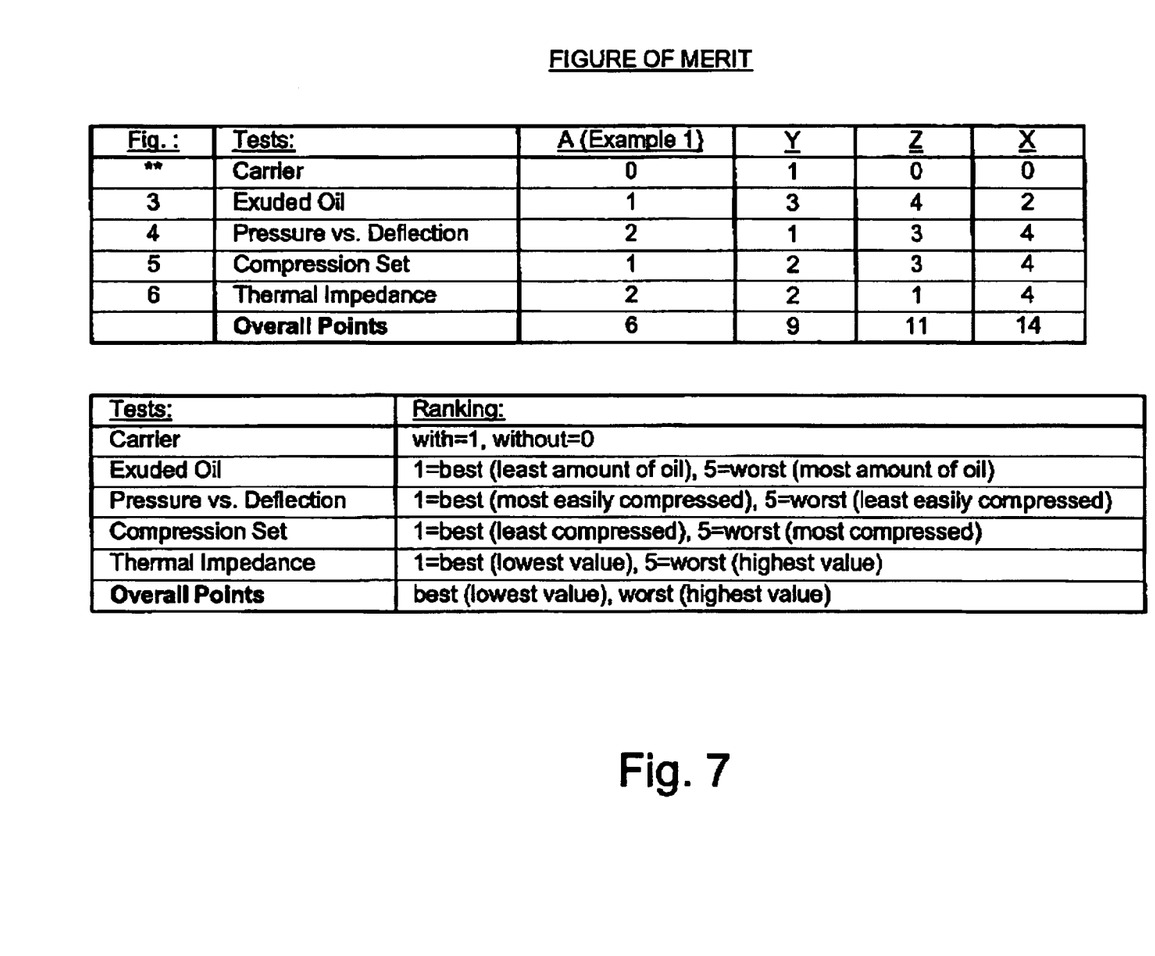
FIG. 7 is an exemplary chart with rankings for each of the four product samples, wherein rankings of zero to four points were awarded to the product samples for each test shown in FIGS. 3 through 6 depending on how that particular product sample performed against the other three product samples.

FIGS. 3, 4, 5, 6, and 7 correspond to the above-described FIGS. 8, 9, 10, 11, and 12 utilizing the Example A material. Again, it is shown that our Example A was ranked first in the exuded oil test (FIG. 3), second in the pressure v. deflection test (FIG. 4), first in the compression set test (FIG. 5), and second in the thermal impedance test (FIG. 6). Rankings as shown in FIG. 7 again placed our disclosed Example A as the top ranking.

Again, these tests were conducted to show that the use of the three part VFF, HCP and cross linker base can be used with the powder composed of the previously mentioned particles so that a competitive formulation can be achieved having suitable thermal impedance and elastomeric characteristics.

Having arrived at a preferred formulation for a 0.5 mm and a 2.5 mm pad it is recognized that the above formulations provide guidelines for formation of pads approximating such thickness as well as thicknesses between 0.25 mm and 5.0 mm, if needed. A review of the percentages by weight illustrate that less VFF and HCP is used in the 0.5 mm pad than the 2.5 mm it being recognized that the 0.5 mm pad can be stiffer as it need not have the same elastomeric properties as the 2.5 mm pad. However, greater elastomeric properties are needed for the FIG. 1 pad as greater conformance is needed in the FIG. 1 environment. Also, as the cross linker and high particle loading are known to solidify the material, more cross linker is utilized in the 0.5 mm pad environment than the 2.5 mm pad environment as a stiffer 0.5 mm pad need not conform around the electrical components as in the 2.5 mm pad.

Thus, a range of thermal pads may be developed suitable for use between nominally flat surfaces (FIG. 2), and the thicker (FIG. 1) environment suitable for use between surfaces having greater irregularities.

We thus have found that the combination of vinyl functional fluid, hydrogen-capped polysiloxane and cross linker enables one to arrive at a polymer combinable with the above particles which will not compromise the desired performance characteristics of the resulting material. Given the above formulations as a starting point, it is understood that a thermal pad of various thicknesses and performances can be made for the job at hand by varying the percentages of the various elements according to the desired elastomeric, cohesion or thermal impedance characteristics.

Thus, it is understood that the use of our three part VFF, HCP and cross linker base to which the above particles can be added presents a starting point for forming thermal pads of variable properties not heretofore shown in the art.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. A method for choosing the materials comprising a silicone thermal pad for use between a heat sink and an electronic component comprising the steps of:
   a. choosing a vinyl functional fluid product having R groups of H, OH or Me;
   b. choosing a hydrogen-capped polysiloxane product for addition to said vinyl functional fluid having R groups of H, Me or OH whereby to extend the chain of said vinyl functional fluid, said hydrogen-capped polysiloxane also partially cross linking said vinyl functional fluid;
   c. choosing a reactive silicone polymer cross linker containing the silicon-hydride groups whereby to enhance the cross linkage of said vinyl functional fluid;
   d. choosing an amount of powder in the form of thermally conductive particles to enhance heat conductivity;
   f. adding an inhibitor to control the reaction of said elements, if required;
   g. mixing said elements of said preceding steps to produce a thermal compound;
   h. de-airing said compound;
   i. adding a platinum catalyst, if required;
   j. mixing said compound in a manner to avoid air entrapment;
   k. heating said compound to accelerate curing, if required;
   l. fabricating said compound into a thermal pad;
   wherein said thermal pad is adapted for positioning between a relatively flat surface of a component and a relatively flat surface of a heat sinks wherein said vinyl functional fluid is approximately 25.7% by weight, said hydrogen-capped polysiloxane is approximately 1.5% by weight, said cross linker is approximately 0.7% by weight, and said aluminum oxide powder having particles of approximately 17.5 microns therein of approximately 70.6% by weight.

2. The method as claimed in claim 1 wherein said thermal pad is approximately 0.5 mm in thickness.

3. A method for choosing the materials comprising a silicone thermal pad for use between a heat sink and an electronic component comprising the steps of:
   a. choosing a vinyl functional fluid product having R groups of H, OH or Me;
   b. choosing a hydrogen-capped polysiloxane product for addition to said vinyl functional fluid having R groups of H, Me or OH whereby to extend the chain of said vinyl functional fluid, said hydrogen-capped polysiloxane also partially cross linking said vinyl functional fluid;
   c. choosing a reactive silicone polymer cross linker containing the silicon-hydride groups whereby to enhance the cross linkage of said vinyl functional fluid;
   d. choosing an amount of powder in the form of thermally conductive particles to enhance heat conductivity;
   f. adding an inhibitor to control the reaction of said elements, if required;
   g. mixing said elements of said preceding steps to produce a thermal compound;
   h. de-airing said compound;
   i. adding a platinum catalyst, if required;

j. mixing said compound in a manner to avoid air entrapment;
k. heating said compound to accelerate curing, if required;
l. fabricating said compound into a thermal pad;
wherein said thermal pad is adapted for positioning between said electronic component and said heat sink, said vinyl functional fluid being approximately 30.1% by weight, said hydrogen-capped polysiloxane being approximately 9.8% by weight, said cross linker being approximately 0.30% by weight, and said aluminum oxide powder being approximately 58.4% by weight and containing particles of approximately 64 microns therein.

4. The method as claimed in claim 1 wherein said thermal pad is approximately 2.50 mm in thickness.

5. A method for arriving at a formulation for the materials comprising a silicone thermal pad having a thickness selectable from a range of 0.5 mm to 2.5 mm for use between a heat sink and an electronic component comprising the steps of:
   a. choosing a vinyl functional fluid product having R groups of H, OH or Me in a range of approximately 25.68% to 30.09% by weight;
   b. choosing a hydrogen capped polysiloxane product for addition to said vinyl functional fluid having R groups of H, Me or OH in a range of approximately 1.54% to 9.81% by weight whereby to extend the chain of said vinyl functional fluid, said hydrogen capped polysiloxane also partially cross linking said vinyl functional fluid;
   c. choosing a reactive silicone polymer cross linker containing the silicon hydride groups in a range of approximately 0.69% to 0.27% by weight whereby to enhance the cross linkage of said vinyl functional fluid;
   d. choosing an amount of powder in the form of thermally conductive particles in a range of approximately 70.63% to 58.37% by weight, said powder for the conductivity of heat;
   e. varying the amount by weight of said preceding elements to vary the elastomeric properties and/or thermal impedance of a resulting compound;
   f. adding an inhibitor to control the reaction of said elements, if required;
   g. mixing said elements of said preceding steps to produce a composition;
   h. de-airing said composition;
   i adding a platinum catalyst to enhance curing, if required;
   j. mixing said composition in a manner to avoid air entrapment;
   k. heating said composition to accelerate curing, if required;
   l. fabricating said resulting composition into a thermal pad according to said selected thickness.

* * * * *

UNITED STATES PATENT AND TRADEMARK OFFICE
CERTIFICATE OF CORRECTION

PATENT NO. : 7,119,143 B2
APPLICATION NO. : 10/793612
DATED : October 10, 2006
INVENTOR(S) : Jarnjevic et al.

It is certified that error appears in the above-identified patent and that said Letters Patent is hereby corrected as shown below:

CLAIM 1
Column 10, line 27: replace "compound" with --composition--
Column 10, line 28: replace "compound" with --composition--
Column 10, line 30: replace "compound" with --composition--
Column 10, line 32: replace "compound" with --composition--
Column 10, line 33: replace "compound" with --composition--
Column 10, line 36: replace "sinks" with --sink,--

CLAIM 3
Column 10, line 64: replace "compound" with --composition--
Column 10, line 65: replace "compound" with --composition--
Column 11, line 1: replace "compound" with --composition--
Column 11, line 2: replace "compound" with --composition--
Column 11, line 3: replace "compound" with --composition--

CLAIM 4
Column 11, line 14: replace "1" with --3--

Signed and Sealed this

Third Day of July, 2007

JON W. DUDAS
*Director of the United States Patent and Trademark Office*